Patented July 31, 1951

2,562,244

UNITED STATES PATENT OFFICE 2,562,244

PRODUCTION OF HEXAALKYL TETRAPHOSPHATES

Michael Puchir, Wilmington, and Sager Tryon, Claymont, Del., assignors to Allied Chemical & Dye Corporation, New York, N. Y., a corporation of New York No Drawing. Application January 21, 1949, Serial No. 72,084

11 Claims. (Cl. 260—461)

This invention relates to production of hexaalkyl tetraphosphates. More particularly the invention is concerned with improved procedure for preparation of hexaalkyl tetraphosphates such as the hexaethyl and hexabutyl derivatives by reaction of trialkyl phosphate with phosphorus oxychloride.

It is known to react trialkyl phosphates with phosphorus oxychloride to produce the corresponding hexalkyl tetraphosphates. These tetraphosphate products, particularly the hexaethyl and hexabutyl derivatives, find application as insecticides.

In connection with recent work related particularly to the reaction of triethyl phosphate and phosphorus oxychloride, the hexaethyl tetraphosphate previously thought produced by the reaction, was found not to exist as a pure substance in this form, but rather as a mixture of organic phosphates having an average molecular weight and analysis corresponding to hexaethyl tetraphosphate of the formula $(C_2H_5O)_6P_4O_7$. The active insecticidal ingredient in the above mixture is believed to be a tetraethyl phosphate, probably tetraethyl peroxydiphosphate, present to the extent of about 10–20% in commercial hexaethyl tetraphosphate, while the inactive material is thought to be a mixture of simple and complex ethyl phosphates having negligible toxicity.

Thus, since the reaction between trialkyl phosphates and phosphorus oxychloride appears to produce a mixture of organic phosphates, the various ingredients of which mixture have not all been definitely ascertained but whose overall composition corresponds approximately to the hexaalkyl tetraphosphate, it is intended that the terms "hexaalkyl tetraphosphate," "hexaethyl tetraphosphate," "hexabutyl tetraphosphate," etc. used throughout the specification, denote and include the product formed by reaction of the corresponding trialkyl phosphate and phosphorus oxychloride, regardless of the exact composition of such product.

One object of our invention is to provide an improved procedure for reacting trialkyl phosphates with phosphorus oxychloride. Another object is to increase the rate of reaction and thus decrease the time required for reaction between trialkyl phosphates and phosphorus oxychloride for production of hexaalkyl tetraphosphates. A still further object is to accelerate the reaction between triethyl phosphate or tributyl phosphate, and phosphorus oxychloride to form hexaethyl tetraphosphate or hexabutyl tetraphosphate, respectively.

Other objects and advantages will appear as the description of the invention proceeds.

We have discovered that the reaction between a trialkyl phosphate and phosphorus oxychloride is greatly facilitated by incorporating in the reaction mixture as catalyst a substance selected from the group consisting of nickel, cobalt and manganese. The catalyst utilized in accordance with the invention for making hexaalkyl tetraphosphate materials by the above reaction may be in the form either of the free metal or a compound of the metal which is soluble in the reaction mixture. By carrying out the reaction in the presence of the aforementioned catalysts, the reaction proceeds at a substantially higher reaction rate at a given temperature as compared to the rate of reaction in the absence of a catalyst, or, particularly when working with compounds tending to decompose readily, use of such catalysts permits operation at a given reaction rate at lower temperatures than in the absence of a catalyst, thereby minimizing or avoiding decomposition of such compounds.

The general reaction involved in the process of the invention may be indicated simply as follows:

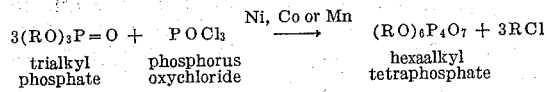

$$3(RO)_3P=O + POCl_3 \xrightarrow{\text{Ni, Co or Mn}} (RO)_6P_4O_7 + 3RCl$$

trialkyl phosphate    phosphorus oxychloride    hexaalkyl tetraphosphate where R represents an alkyl group, e. g. methyl, ethyl, propyl, butyl, hexyl, 2-ethyl-hexyl, etc. While the invention process is generally applicable to any type of trialkyl phosphate starting material, we find that our improved catalytic process is of particular value when utilizing triethyl phosphate or tributyl phosphate as starting material to produce the corresponding hexaethyl tetraphosphate or hexabutyl tetraphosphate material as product.

The chemical, physical and insecticidal properties of the hexaalkyl tetraphosphate material produced using the catalysts in accordance with the invention are substantially the same as for the hexaalkyl tetraphosphates formed by reacting trialkyl phosphates and phosphorus oxychloride in the conventional manner without the use of catalysts. Thus, the chemical composition, density, refractive index and toxicity of hexaethyl tetraphosphate formed by our catalytic process are about the same as for hexaethyl tetraphosphate produced non-catalytically.

As above indicated, the nickel, cobalt, or manganese employed as catalyst may be present in the reaction mixture either in the form of the free metal, which usually is applied in a finely divided state, or in the form of a compound of nickel, cobalt, or manganese, which compound is soluble in the reaction mixture under the conditions of reaction. We have found it preferable to apply the catalysts nickel, cobalt and manganese in the form of their soluble compounds, examples of suitable compounds of this type including the acetates, carbonates, formates, and naphthenates of such metals. The nickel, cobalt or manganese catalyst, whether in the form of the free metal or a compound of the metal dissolves in the reaction mixture to form a soluble catalyst of unknown composition. We are uncertain as to the exact manner in which the catalysts of the invention function and do not intend that the invention be limited by any theory as to their action.

While rate of the above reaction for production of hexaalkyl tetraphosphates is substantially increased by application of any one of the three above-noted catalysts, it is of course understood that in certain cases one substance, e. g. nickel, may be more effective than the others, and in other instances cobalt or manganese may prove to bring about greatest acceleration of the reaction. Ordinarily, however, we prefer to employ either nickel or cobalt as catalyst for the above reaction, particularly in the form of a soluble compound such as nickel acetate or cobalt acetate. The amount of catalyst utilized may vary considerably but in ordinary commercial practice we have found that good results are realized when the reaction mixture contains an amount of catalyst, either in the form of the free metal or a soluble compound thereof, such as to provide from .001% to 1.0%, preferably .001% to .50%, based on the weight of the charge, of nickel, cobalt or manganese.

The temperature at which the reaction between the trialkyl phosphate and phosphorus oxychloride is carried out may vary from about 120° to 170° C. In production of hexaethyl tetraphosphate from the corresponding triethyl phosphate we have found the temperature of reaction of 130° to 150° C. to be most suitable with best results obtained at about 140° C., while for production of hexabutyl tetraphosphate from tributyl phosphate in accordance with the above-noted reaction, a lower temperature range of 120°–135° C. is required with a temperature of 130° C. preferred.

The following detailed examples are illustrative of the invention, all quantities being designated in parts by weight:

EXAMPLE 1

*(Hexaethyl tetraphosphate-uncatalyzed reaction)*

531 parts triethyl phosphate and 150 parts phosphorus oxychloride were mixed and heated to 140° C., the mixture being maintained at this temperature until the reaction was completed. At various intervals samples of the reaction mixture were removed and analyzed for inorganic chloride content derived from the phosphorus oxychloride being consumed, the reaction being considered essentially completed when the chloride content decreased to less than 0.1 gram per liter. Time of reaction was about 67 minutes.

EXAMPLE 2

*(Hexaethyl tetraphosphate-nickel catalyzed reaction)*

571 parts triethyl phosphate, 160 parts phosphorus oxychloride and 7 parts nickel acetate, $Ni(CH_3COO)_2$, were mixed and heated to about 140° C. with temperature maintained at this value until reaction was completed. The amount of nickel present in the reaction mixture was about 0.3% of the weight of the charge. Periodically, samples of the reaction mixture were removed and analyzed for inorganic chloride. The reaction was considered essentially completed when the chloride content dropped to less than 0.1 gram per liter. Reaction time was about 37 minutes as compared to 67 minutes for the corresponding uncatalyzed reaction of Example 1.

EXAMPLE 3

*(Hexaethyl tetraphosphate-nickel catalyzed reaction)*

578 parts triethyl phosphate and 158 parts phosphorus oxychloride were placed in a reaction vessel and a piece of nickel metal was suspended in the mixture. The reaction mixture was then heated to about 140° C. and maintained at this temperature until the reaction was completed. Periodically, small samples of the reaction mixture were removed and analyzed for inorganic chloride, the reaction being considered completed when the chloride content was less than 0.1 gram per liter. The amount of nickel which went into solution in the reaction mixture to function as catalyst therein was about .006% of the weight of the charge. Reaction time was 42 minutes as compared to 67 minutes for the corresponding uncatalyzed reaction of Example 1.

EXAMPLE 4

*(Hexaethyl tetraphosphate-manganese catalyzed reaction)*

627 parts triethyl phosphate, 178 parts phosphorus oxychloride and 3 parts manganese acetate, $Mn(CH_3COO)_2$, were mixed and heated to about 140° C. and maintained at this temperature until reaction was completed. The amount of manganese present in the reaction mixture was about 0.1% of the weight of the charge. Periodically, small samples of the reaction mixture were removed and analyzed for inorganic chloride. The reaction was considered essentially completed when the chloride content was about 0.1 gram per liter. Reaction time was 40 minutes as compared to 67 minutes for the corresponding uncatalyzed reaction of Example 1.

EXAMPLE 5

*(Hexabutyl tetraphosphate-uncatalyzed reaction)*

839 parts tributyl phosphate and 161 parts phosphorus oxychloride were mixed and the reaction mixture heated to about 130° C. with temperature maintained at this point until the reaction was completed. Butyl chloride formed in the reaction was distilled off and the overhead butyl chloride vapors were condensed, the non-condensable gases being passed through caustic and a dry ice-acetone trap maintained at about —70° C. to remove any HCl and butylene coming off. At various intervals samples of the reaction mixture were removed and analyzed for inorganic chloride, the reaction being considered essentially completed when the chloride content dropped to less than 0.1 gram per liter. Time of reaction was about 1.7 hours.

EXAMPLE 6

*(Hexabutyl tetraphosphate-cobalt catalyzed reaction)*

839 parts tributyl phosphate, 161 parts phosphorus oxychloride and 9 parts cobalt acetate, $Co(CH_3COO)_2$, were mixed. The reaction mixture was heated to about 130° C. and maintained at this point until the reaction was completed. The amount of cobalt present in the reaction mixture was about 0.3% of the weight of the charge. Butyl chloride formed in the reaction was distilled off and the overhead butyl chloride vapors were condensed, the non-condensable gases being passed through caustic and a Dry Ice-acetone trap maintained at about −70° C. to remove any HCl and butylene coming off. Periodically, samples of the reaction mixture were removed and analyzed for inorganic chloride, the reaction being considered essentially completed when the chloride content was less than 0.1 gram per liter. Reaction time was about 0.8 hour as compared to 1.7 hours for the corresponding uncatalyzed reaction of Example 5.

The insecticidal activity of the hexaethyl and hexabutyl tetraphosphate materials prepared in Examples 2, 3, 4 and 6 using the catalysts of the invention was equally as great as for the same materials produced non-catalytically in Examples 1 and 5, respectively, as shown by comparative tests against red spiders and pea aphids.

From the above it is seen that by carrying out the reaction between a trialkyl phosphate and phosphorus oxychloride to form the corresponding hexaethyl tetraphosphates, in the presence of the nickel, cobalt or manganese type catalysts of the invention, reaction rates are markedly increased and time required for reaction correspondingly reduced as compared to the uncatalyzed reaction, thereby enabling production capacity of a given unit to be increased in like proportion. The increased reaction rates obtained by practice of the invention may be realized both for batch and for continuous operation but the benefits are most striking when the process is applied to the commercially more valuable continuous mode of operation. Further, where considerable decomposition of the reactants or products may take place at the temperature required for the uncatalyzed reaction, by use of the catalysts of the invention the reaction temperature may be decreased to avoid such decomposition while at the same time realizing a rate of reaction as great as or even greater than that obtainable at the higher temperature of the uncatalyzed reaction. This is true particularly in the case of hexabutyl tetraphosphate, which tends to decompose at temperatures above 130° C.

Ordinarily, the equipment employed in carrying out the reaction of the invention may be lined with any material which is inert with respect to the reactants and products formed, e. g. glass.

Since various changes and modifications in the invention may be practiced by those skilled in the art without departing from the spirit of the invention, the above is to be taken as illustrative and not in a limiting sense.

We claim:

1. The process which comprises reacting a trialkyl phosphate with phosphorous oxychloride, the reaction mixture containing as catalyst a substance selected from the group consisting of nickel, cobalt and manganese, and their compounds soluble in the reaction mixture.

2. The process which comprises reacting a trialkyl phosphate with phosphorus oxychloride, the reaction mixture containing as catalyst a compound of nickel soluble in the reaction mixture.

3. The process which comprises reacting a trialkyl phosphate with phosphorus oxychloride, the reaction mixture containing as catalyst a compound of cobalt soluble in the reaction mixture.

4. The process which comprises reacting a trialkyl phosphate with phosphorus oxychloride, the reaction mixture containing as catalyst a compound of manganese soluble in the reaction mixture.

5. The process which comprises heating a trialkyl phosphate and phosphorus oxychloride at temperatures of 120° to 170° C., the reaction mixture containing as catalyst .001%–1.0% of the weight of the charge of a substance selected from the group consisting of nickel, cobalt and manganese, and their compounds soluble in the reaction mixture.

6. The process which comprises heating a trialkyl phosphate and phosphorus oxychloride at temperatures of 120° to 170° C., the reaction mixture containing as catalyst .001%–.50% of the weight of the charge, of nickel in the form of a compound soluble in the reaction mixture.

7. The process which comprises heating a trialkyl phosphate and phosphorus oxychloride at temperatures of 120° to 170° C., the reaction mixture containing as catalyst .001%–.50% of the weight of the charge, of cobalt in the form of a compound soluble in the reaction mixture.

8. The process which comprises heating triethyl phosphate and phosphorus oxychloride in a molar ratio of about 3 to 1 at temperatures of 130° to 150° C., the reaction mixture containing as catalyst .001%–.50% of the weight of the charge, of nickel in the form of a compound soluble in the reaction mixture.

9. The process which comprises heating tributyl phosphate and phosphorus oxychloride in a molar ratio of about 3 to 1 at temperatures of 120° to 135° C., the reaction mixture containing as catalyst .001%–.50% of the weight of the charge, of cobalt in the form of a compound soluble in the reaction mixture.

10. The process which comprises heating triethyl phosphate and phosphorus oxychloride in a molar ratio of about 3 to 1 at temperatures of 130° to 150° C., the reaction mixture containing as catalyst .001%–.50% of the weight of the charge, of nickel in the form of nickel acetate.

11. The processs which comprises heating tributyl phosphate and phosphorus oxychloride in a molar ratio of about 3 to 1 at temperatures of 120° to 135° C., the reaction mixture containing as catalyst .001%–.50% of the weight of the charge, of cobalt in the form of cobalt acetate.

MICHAEL PUCHIR.
SAGER TRYON.

REFERENCES CITED

The following references are of record in the file of this patent:

UNITED STATES PATENTS

| Number | Name | Date |
| --- | --- | --- |
| 2,336,302 | Schrader | Dec. 7, 1943 |

FOREIGN PATENTS

| Number | Country | Date |
| --- | --- | --- |
| 203,820 | Great Britain | Sept. 20, 1923 |
| 470,328 | Great Britain | Aug. 9, 1937 |

Certificate of Correction

Patent No. 2,562,244

July 31, 1951

MICHAEL PUCHIR ET AL.

It is hereby certified that error appears in the printed specification of the above numbered patent requiring correction as follows:

Column 1, line 6, before "trialkyl" insert *a*; column 5, line 21, for "hexaethyl" read *hexaalkyl*;

and that the said Letters Patent should be read as corrected above, so that the same may conform to the record of the case in the Patent Office.

Signed and sealed this 2nd day of October, A. D. 1951.

[SEAL]

THOMAS F. MURPHY,
*Assistant Commissioner of Patents.*